United States Patent
Ginther et al.

(10) Patent No.: US 9,428,242 B2
(45) Date of Patent: Aug. 30, 2016

(54) VARIABLE RIDE HEIGHT SYSTEMS AND METHODS

(71) Applicant: Harley-Davidson Motor Company Group, LLC, Milwaukee, WI (US)

(72) Inventors: Brian Ginther, Pewaukee, WI (US); Joseph P. Lomonaco, Oconomowoc, WI (US); Maxim Kolesnikov, Brookfield, WI (US); Bryan Fulmer, Pewaukee, WI (US)

(73) Assignee: Harley-Davidson Motor Company Group, LLC, Milwaukee, WI (US)

( * ) Notice: Subject to any disclaimer, the term of this patent is extended or adjusted under 35 U.S.C. 154(b) by 0 days.

(21) Appl. No.: 14/625,718

(22) Filed: Feb. 19, 2015

(65) Prior Publication Data

US 2015/0239523 A1 Aug. 27, 2015

Related U.S. Application Data (60) Provisional application No. 61/943,644, filed on Feb. 24, 2014, provisional application No. 62/011,369, filed on Jun. 12, 2014.

(51) Int. Cl.
*B62K 25/00* (2006.01)
*B60G 17/00* (2006.01)
(Continued)

(52) U.S. Cl.
CPC ............ *B62K 25/04* (2013.01); *B60G 17/018* (2013.01); *B60G 2202/40* (2013.01); *B60G 2202/412* (2013.01); *B60G 2202/413* (2013.01); *B60G 2202/42* (2013.01); *B60G 2202/43* (2013.01); *B60G 2300/12* (2013.01); *B60G 2400/0521* (2013.01); *B60G 2400/0523* (2013.01); *B60G 2400/104* (2013.01); *B60G 2400/106* (2013.01); *B60G 2400/204* (2013.01); *B60G 2400/208* (2013.01); *B60G 2400/252* (2013.01); *B60G 2400/82* (2013.01); *B60G 2400/90* (2013.01); *B60G 2500/30* (2013.01); *B60G 2600/26* (2013.01); *B62K 2025/044* (2013.01); *B62K 2025/045* (2013.01)

(58) Field of Classification Search
USPC ......................................................... 701/37
See application file for complete search history.

(56) References Cited

U.S. PATENT DOCUMENTS

| | | | |
|---|---|---|---|
| 4,809,179 A * | 2/1989 | Klinger .............. | B60G 17/0157 280/5.504 |
| 4,949,989 A | 8/1990 | Kakizaki et al. | |
| 5,401,053 A | 3/1995 | Sahm et al. | |

(Continued)

FOREIGN PATENT DOCUMENTS

| EP | 1238834 | 9/2009 |
|---|---|---|
| EP | 2248690 | 11/2010 |

(Continued)

*Primary Examiner* — Yonel Beaulieu
(74) *Attorney, Agent, or Firm* — Michael Best & Friedrich LLP (57) ABSTRACT

Actuator assemblies and methods and systems for using the same. One actuator assembly includes an actuator, and a controller. The controller is configured to receive a command signal from a vehicle electronic control unit, receive a data signal from a sensor, determine a control signal for the actuator based on the command signal from the vehicle electronic control unit and the data signal from the sensor, transmit the control signal to the actuator, determine a status signal based on the control signal, and transmit the status signal to the vehicle electronic control unit.

25 Claims, 7 Drawing Sheets

(51) Int. Cl.
  *B62K 25/04* (2006.01)
  *B60G 17/018* (2006.01)

(56) References Cited

U.S. PATENT DOCUMENTS

| | | | |
|---|---|---|---|
| 5,785,576 | A | 7/1998 | Belton |
| 6,170,921 | B1 | 1/2001 | Naerheim |
| 6,275,143 | B1 | 8/2001 | Stobbe |
| 6,467,748 | B1 | 10/2002 | Schick et al. |
| 6,543,799 | B2 | 4/2003 | Miyoshi |
| 6,547,303 | B1 | 4/2003 | Anderson |
| 6,620,023 | B2 | 9/2003 | Yeung |
| 6,625,522 | B2 * | 9/2003 | Sakurai ............... B60T 8/885 701/1 |
| 6,708,094 | B2 | 3/2004 | Charaudeau et al. |
| 6,877,488 | B2 | 4/2005 | Washeleski et al. |
| 6,907,323 | B2 | 6/2005 | Avenel |
| 6,945,843 | B1 | 9/2005 | Motosko |
| 7,062,367 | B2 | 6/2006 | Kim |
| 7,401,794 | B2 | 7/2008 | Laurent et al. |
| 7,446,653 | B2 | 11/2008 | Alvarez Garcia et al. |
| 7,487,973 | B1 | 2/2009 | Kesselbruber et al. |
| 7,677,588 | B2 | 3/2010 | Coers et al. |
| 7,725,226 | B2 | 5/2010 | Urababa et al. |
| 7,730,643 | B2 | 6/2010 | Mishra et al. |
| 7,747,368 | B2 | 6/2010 | Tomida et al. |
| 7,844,379 | B2 | 11/2010 | Tang et al. |
| 8,342,541 | B2 | 1/2013 | Wurmthaler et al. |
| 8,380,394 | B1 | 2/2013 | Snodgrass |
| 8,423,241 | B2 | 4/2013 | Muders et al. |
| 8,424,976 | B2 | 4/2013 | Dinkel et al. |
| 8,430,458 | B2 | 4/2013 | Kaminski et al. |
| 8,626,415 | B2 | 1/2014 | Geyer et al. |
| 8,672,337 | B2 | 3/2014 | van der Knaap et al. |
| 8,843,273 | B2 | 9/2014 | Wesling et al. |
| 8,909,386 | B2 * | 12/2014 | Takeuchi ............... B60W 40/12 303/139 |
| 2002/0190872 | A1 | 12/2002 | Suman et al. |
| 2004/0090020 | A1 | 5/2004 | Braswell |
| 2007/0096516 | A1 | 5/2007 | Heeg et al. |
| 2008/0021611 | A1 | 1/2008 | Hiebert et al. |
| 2008/0114519 | A1 | 5/2008 | DuFaux et al. |
| 2009/0037051 | A1 | 2/2009 | Shimizu et al. |
| 2009/0248256 | A1 * | 10/2009 | Nishijima ............... B60Q 1/115 701/49 |
| 2010/0276906 | A1 | 11/2010 | Galasso et al. |
| 2011/0125381 | A1 | 5/2011 | Szell et al. |
| 2011/0127121 | A1 | 6/2011 | Laubenthal et al. |
| 2011/0202236 | A1 * | 8/2011 | Galasso ............... B62K 25/04 701/37 |
| 2012/0192757 | A1 | 8/2012 | Schiffers et al. |
| 2014/0012482 | A1 * | 1/2014 | Dagenais ............... B60T 8/1706 701/101 |
| 2014/0172233 | A1 | 6/2014 | Hiebert et al. |

FOREIGN PATENT DOCUMENTS

| | | |
|---|---|---|
| JP | H3517696 | 4/2004 |
| KR | 20100098155 | 9/2010 |
| WO | WO 2008071663 | 6/2008 |

\* cited by examiner

VARIABLE RIDE HEIGHT SYSTEMS AND METHODS

RELATED APPLICATIONS

This application claims priority to U.S. Provisional Application No. 61/943,644, entitled "Smart Actuator," filed Feb. 24, 2014, and U.S. Provisional Application No. 62/011,369, entitled "Variable Ride Height Systems and Methods," filed Jun. 12, 2014, the entire contents of both provisional applications are hereby incorporated by reference.

FIELD

Embodiments of the invention relate to actuators for use in a vehicle. In particular, some embodiments of the invention provide systems and methods for controlling the front and rear suspension of a vehicle, such as a motorcycle, with actuators.

BACKGROUND

In conventional architectures, a vehicle can include one or more electronic actuators. The electronic actuators are controlled by an electronic control unit ("ECU"). In particular, the ECU receives data from one or more data sources (e.g., sensors), processes the data, and issues commands to the electronic actuators. As the ECU is located separate from the actuators, complex wiring is required. Furthermore, because the ECU often performs other functionality than just controlling the actuators, the ECU is complex and, hence, expensive.

SUMMARY

Accordingly, embodiments of the invention provide smart actuators that include one or more electronic actuators and a dedicated or local controller. The controller is configured to receive data from one or more data sources (e.g., sensors), process the data, and issue commands to the actuators. The controller is also configured to provide status information to a supervisory electronic control unit ("ECU") and receive operating parameters from the ECU. Accordingly, the control of the actuators is performed locally at the actuators, which decreases the complexity of the wiring and the ECU, while still allowing the ECU to control and manage the actuators.

For example, one embodiment of the invention provides an actuator assembly that includes an actuator, and a controller. The controller is configured to receive a command signal from a vehicle electronic control unit, receive a data signal from a sensor, determine a control signal for the actuator based on the command signal from the vehicle electronic control unit and the data signal from the sensor, transmit the control signal to the actuator, determine a status signal based on the control signal, and transmit the status signal to the vehicle electronic control unit.

Another embodiment of the invention provides a system for controlling a suspension system of a vehicle. The system includes a first actuator assembly associated with a front suspension system of a vehicle. The first actuator assembly includes a first actuator and a first controller. The first controller is configured to receive a first command signal from a vehicle electronic control unit, receive a first data signal from a first sensor, determine a first control signal for the first actuator based on the first command signal from the vehicle electronic control unit and the first data signal from the first sensor, transmit the first control signal to the first actuator, determine a first status signal based on the first control signal, and transmit the first status signal to the vehicle electronic control unit. The system also includes a second actuator assembly associated with a rear suspension system of the vehicle. The second actuator assembly includes a second actuator and a second controller. The second controller is configured to receive a second command signal from the vehicle electronic control unit, receive a second data signal from a second sensor, determine a second control signal for the second actuator based on the second command signal from the vehicle electronic control unit and the second data signal from the second sensor, transmit the second control signal to the second actuator, determine a second status signal based on the second control signal, and transmit the second status signal to the vehicle electronic control unit.

Yet another embodiment of the invention provides a method of controlling a vehicle. The method includes receiving, by a first controller, an input signal representing vehicle operating parameters, and receiving, by the first controller, a target displacement determined by a second controller for a first suspension system of the vehicle. The method also includes determining, by the first controller, a target displacement for a second suspension system of the vehicle based on the target displacement received from the second controller and the input signal, and setting a height of the second suspension system based on the target displacement determined by the first controller for the second suspension system.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect. The term "predetermined" means specified prior to a later event. Also, electronic communications and notifications may be performed using any known means including direct connections (e.g., wired or optical), wireless connections, or other communication.

It should also be noted that a plurality of hardware and software based devices, as well as a plurality of different structural components may be utilized to implement the invention. In addition, it should be understood that embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (e.g., stored on non-transitory computer-readable medium) executable by one or more processors. As such, it should be noted that a plurality of hardware and software based devices, as well as a plurality of different structural components may be utilized to implement the invention. For example, "control units" and "controllers" described in the specification can include one or more processing units (e.g., microprocessor or application-specific integrated circuits ("ASICs")), one or more memory modules including non-transitory computer-readable medium storing instructions and/or data, one or more input/output interfaces, and various connections (e.g., a system bus) connecting the components.

Figure 1:
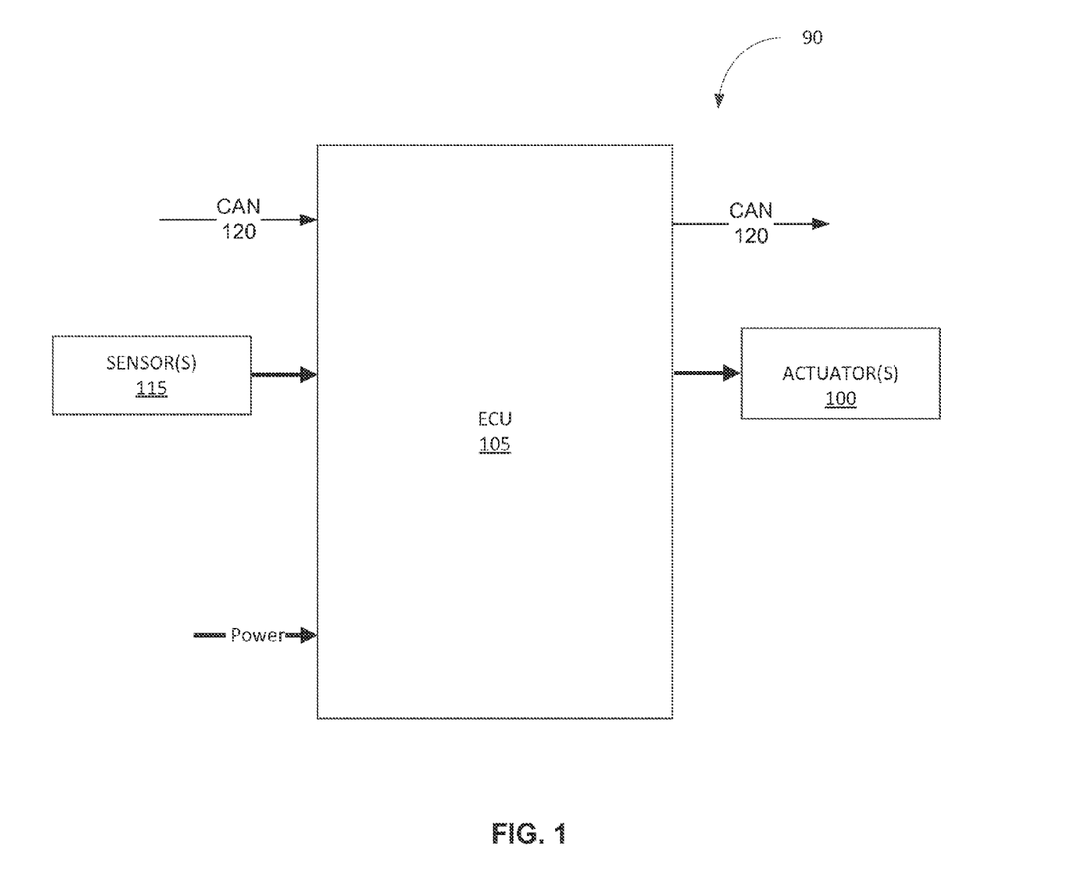
FIG. 1 schematically illustrates an actuator system.

FIG. 1 schematically illustrates an actuator system 90 for a vehicle. The actuator system 90 includes one or more (e.g., electronic) actuators 100, an electronic control unit ("ECU") 105, and one or more sensors 115. The actuators 100 communicate with the ECU 105 (e.g., over a wired connection). The ECU 105 also communicates over a vehicle communication network, such as controller area network ("CAN") bus 120. The ECU 105 also communicates with the one or more sensors 115 (e.g., over a wired connection). In operation, the ECU 105 receives data from the sensors 115 (and, optionally, data received over the CAN bus 120), processes the data, and outputs a command to the actuators 100 (i.e., to drive the actuators 100).

In some embodiments, the sensors 115 and the actuators 100 can be located physically far from the ECU 105, which increases the wiring complexity of the actuator system 90. Also, the ECU 105 commonly performs more functionality than just controlling the actuators 100. Accordingly, the complexity (and, consequently, the cost) of the ECU 105 is increased with every actuator 100 included in the actuator system 90 or potentially included in the actuator system 90. For example, to simplify manufacturing and to allow for ongoing enhancements, the ECU 105 is often programmed to control the actuators 100 even if the vehicle does not include any actuators 100. Similarly, because the ECU 105 performs both the low level motion control of the actuators 100 and the higher level supervisory control of the actuators 100 (e.g., processing data from the sensors 115), the complexity of the ECU 105 is increased.

Figure 2:
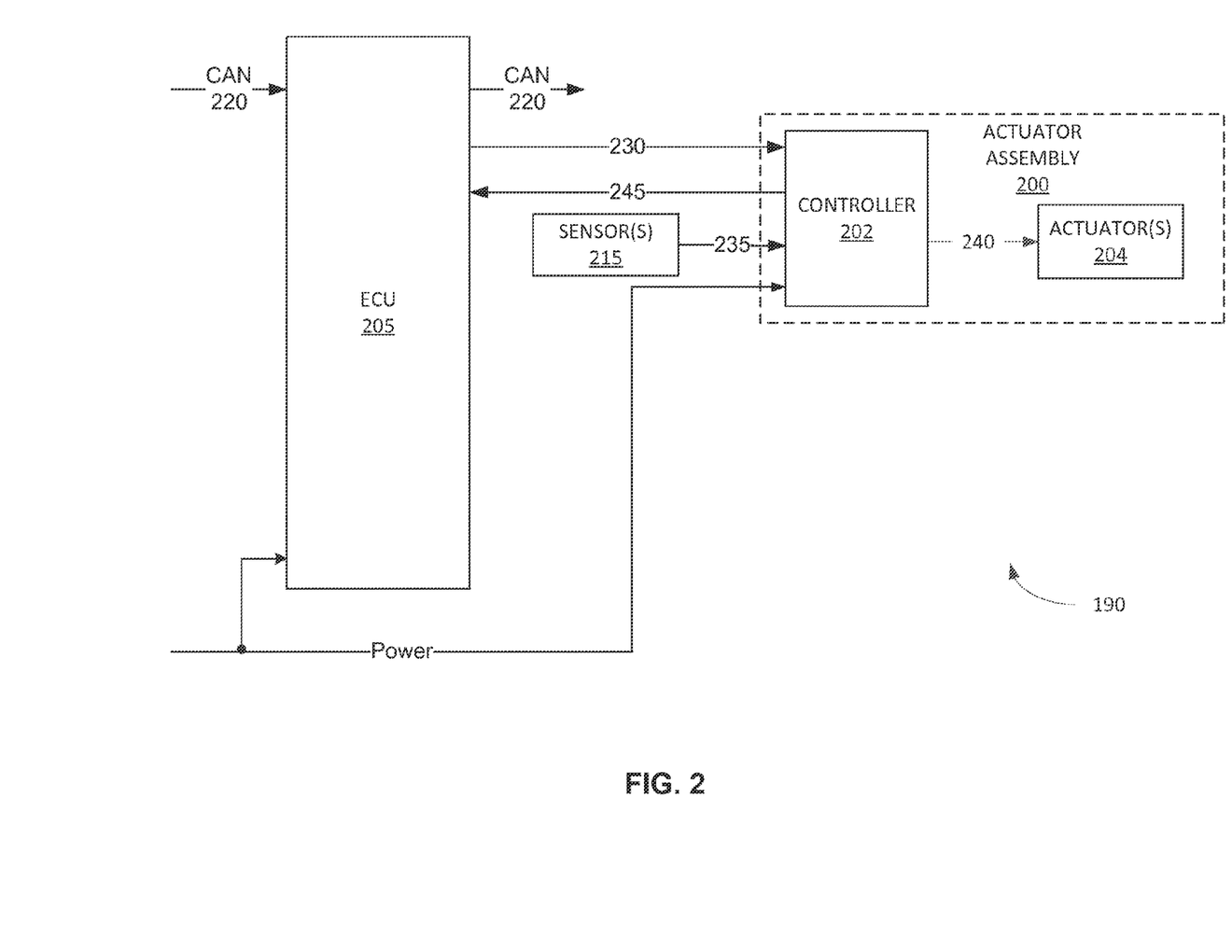
FIG. 2 schematically illustrates an actuator system according to one embodiment of the invention.

Accordingly, to overcome these and other problems, FIG. 2 schematically illustrates an actuator system 190 for a vehicle according to embodiments of the present invention. As illustrated in FIG. 2, the actuator system 190 includes an actuator assembly 200, an ECU 205, and one or more sensors 215. As illustrated in FIG. 2, the actuator assembly 200 includes a dedicated or local controller 202 and one or more (e.g., electronic) actuators 204. In some embodiments, each actuator 204 includes a servo motor and/or a solenoid valve. It should be understood, however, that the actuators 204 can include any type of actuators, including hydraulic actuators, pneumatic actuators, thermal actuators, electronic actuators, magnetic actuators, and mechanical actuators. In some embodiments, the local controller 202 and the actuator 204 are contained within a common housing.

The actuator assembly 200 communicates with the ECU 205 (e.g., over a wired connection). As illustrated in FIG. 2, the ECU 205 also communicates with a vehicle information network, such as a CAN bus 220. The actuator assembly 200 also communicates with the sensors 215 (e.g., over a wired connection). As illustrated in FIG. 2, in some embodiments, the sensors 215 communicate with the actuator assembly 200 (e.g., over a direct wired or wireless connection) and do not communicate with the ECU 205. In particular, as described below in more detail, since the actuator assembly 200 can perform local processing of data, the sensors 215 can communicate with the actuator assembly 200 rather than the ECU 205, which reduces the wiring complexity for the ECU 205.

In operation, the ECU 205 issues a command signal 230 to the actuator assembly 200. The command signal 230 can be based on data the ECU 205 receives over the CAN 220 (e.g., current vehicle operating parameters) and other sources (e.g., a status signal received from the actuator assembly 200 described below in more detail). The controller 202 receives the command signal 230. The controller 202 also receives a data signal 235 from the sensors 215. The controller 202 processes the command signal 230 and the data signal 235 to compute a control signal 240 for the actuators 204 (e.g., a signal to drive the actuators 204). Accordingly, after computing the control signal 240, the controller 202 transmits the control signal 240 to the actuators 204. The controller 202 also generates a status signal 245, which the controller 202 transmits to the ECU 205. The status signal 245 can be based on the control signal 240 transmitted by the controller 202 to the actuators 204 (e.g., indicating a position or state of the actuators 204). In some embodiments, the controller 202 can also be configured to receive sensed information regarding an actual position or state of the actuators 204, which the controller 202 can use to generate the status signal 245.

Thus, the ECU 205 can use the status signal 245 received from the controller 202 (and, optionally, other vehicle information) to supervise operation of the controller 202 and the actuator assembly 200. For example, as noted above, the ECU 205 provides the command signal 230 to the controller 202, which impacts the control signal 240 generated by the controller 202. Accordingly, the ECU 205 can adjust the command signal 230 to modify operation of the actuator assembly 200. For example, in some embodiments, the controller 202 is configured to compare the data signal 235 from the sensors 215 to one or more thresholds to identify when to drive or activate the actuators 204. Thus, the ECU 205 can modify the operation of the actuator assembly 200 by changing one or more of these threshold values using the command signal 230.

As compared to FIG. 1, the actuator system 190 decreases the complexity of the ECU 205 by moving logic specific to the actuators 204 to the local controller 202 of the actuator assembly 200. However, the actuator assembly 200 maintains in communication with the ECU 205 to maintain supervisory control at the ECU 205. The localized functionality of the actuator assembly 200 reduces the complexity of the ECU 205 and provides for greater flexibility between the ECU 205 and the actuator assembly 200 (e.g., new actuator assemblies 200 can be installed without requiring updates to the ECU 205). Similarly, because the actuator assembly 200 can provide local data processing, the sensors 215 can be wired to the actuator assembly 200 rather than the ECU 205, which also decreases wiring complexity.

Figure 3:
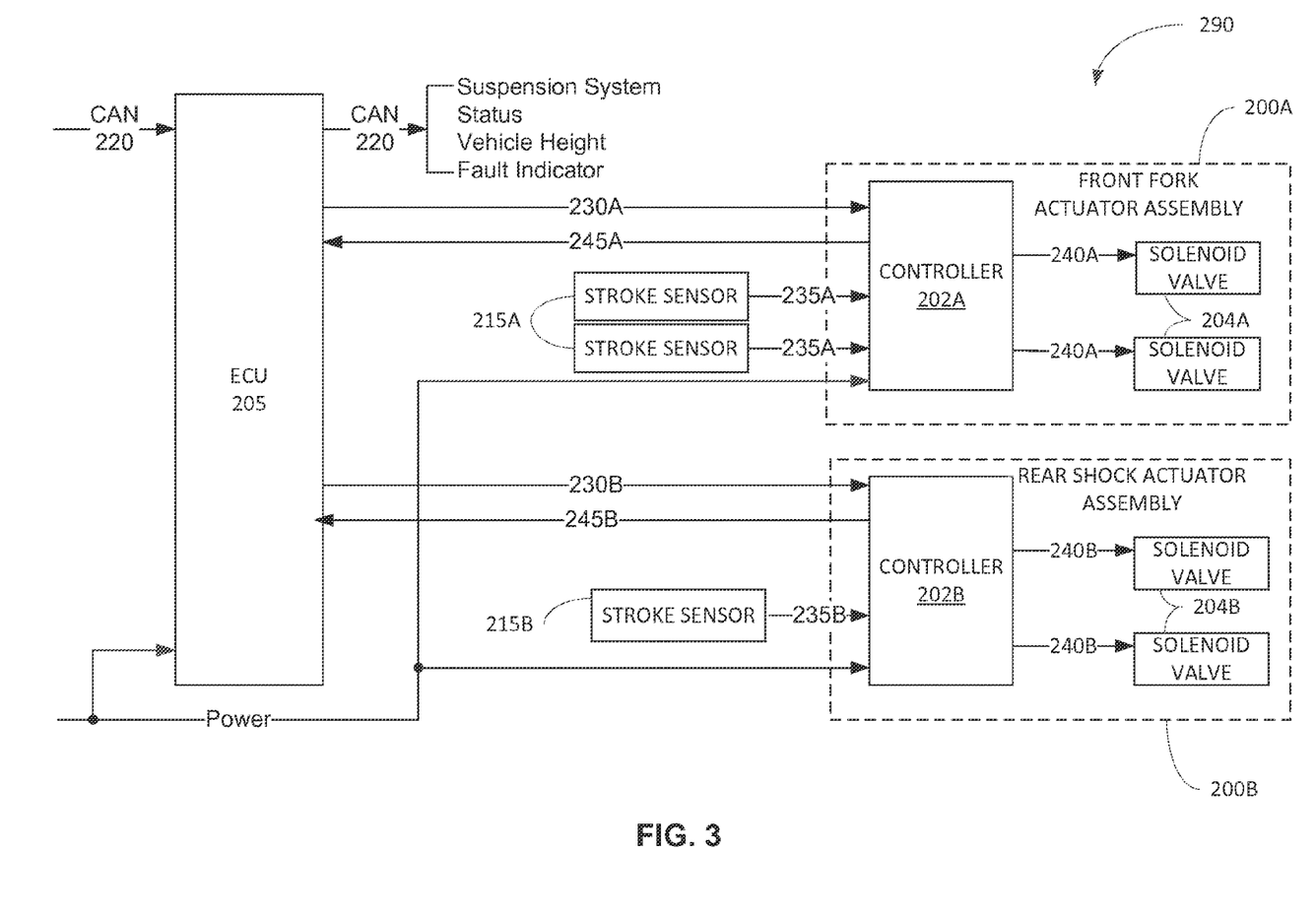
FIG. 3 schematically illustrates an actuator system for controlling a suspension system of a vehicle according to one embodiment of the invention.

The actuator assembly 200 illustrated in FIG. 2 can be used to control various aspects of a vehicle, including, for example, fans, locks, doors, valves, cylinders, ignition, power windows, power mirrors, a sunroof, adaptive headlights, etc. For example, in some embodiments, the actuator assembly 200 can be used to control a variable displacement suspension system of a motorcycle. FIG. 3 schematically illustrates an actuator system 290 for a vehicle that controls a variable displacement suspension system. As illustrated in FIG. 3, the actuator system 290 includes the ECU 205, a front fork actuator assembly 200A, and a rear shock actuator assembly 200B.

Figure 4:
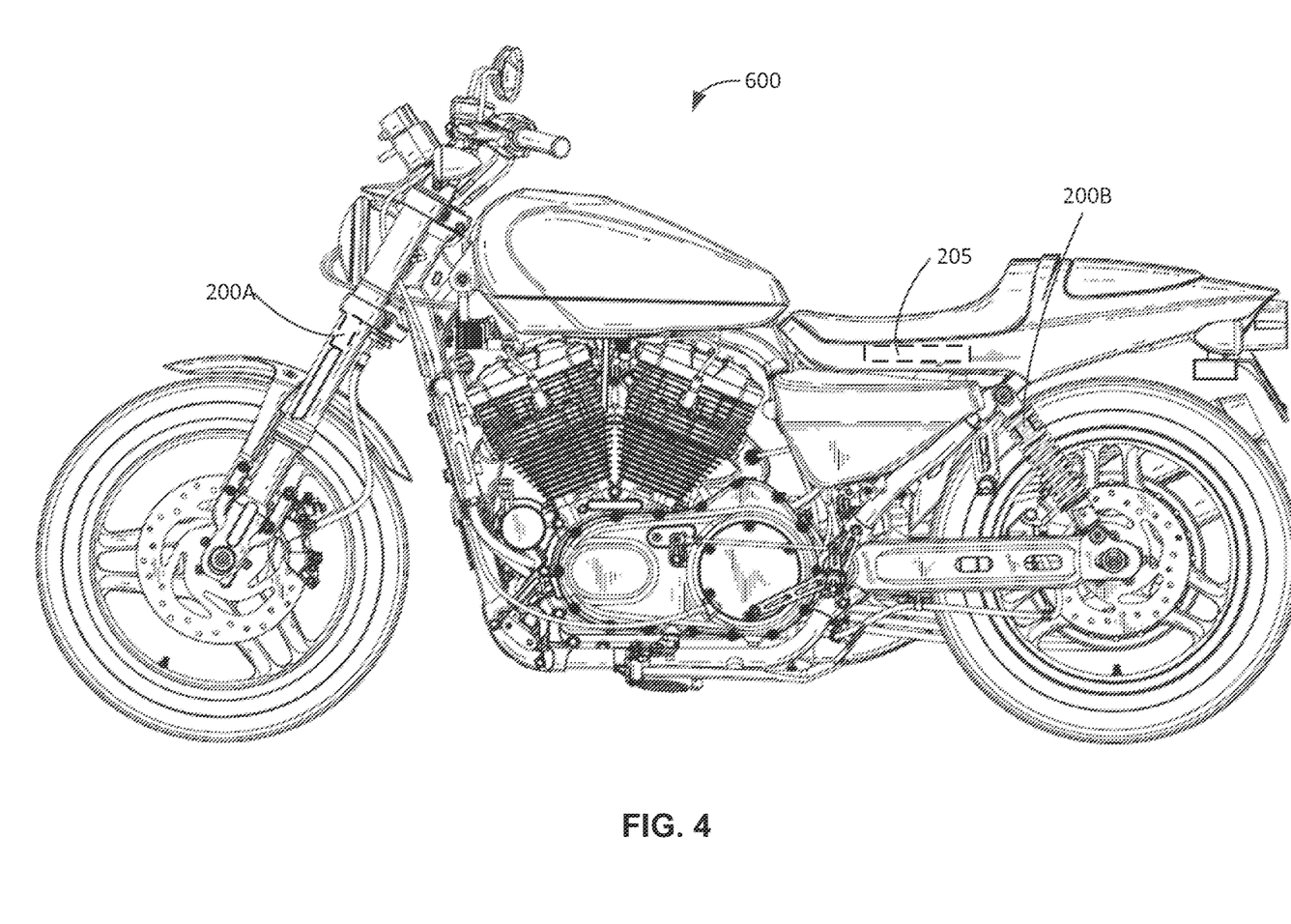
FIG. 4 illustrates a motorcycle including the actuator system of FIG. 3.

As illustrated in FIG. 4, the ECU 205, the front fork actuator assembly 200A, and the rear shock actuator assembly 200B can installed in a motorcycle 600. In some embodiments, the front fork actuator assembly 200A is located within a front fork assembly of the motorcycle 600, and the rear shock actuator assembly 200B is located within the rear shock assembly of the motorcycle 600. In some embodiments, the ECU 205 is located under a seat of the motorcycle 600. It should be understood that FIG. 4 shows one configuration of the actuator system 290, and, in other designs, the location of the ECU 205 and actuator assemblies 200A, 200B may vary based on the vehicle chassis and architecture.

Returning to FIG. 3, the front fork actuator assembly 200A includes a local controller 202A and one or more electronic actuators 204A (e.g., solenoid valves). The local controller 202A communicates with the ECU 205 (e.g., over a wired connection). As illustrated in FIG. 3, the ECU 205 also communicates with the CAN bus 220. The front fork actuator assembly 200A also communicates (e.g., over a wired connection) with one or more sensors 215A (e.g., stroke sensors). In some embodiments, the sensors 215A measure a position of a front jack in a suspension stroke of a front suspension system of the motorcycle 600.

The rear shock actuator assembly 200B includes a local controller 202B and one or more (e.g., electronic) actuators 204B (e.g., solenoid valves). The rear shock actuator assembly 200B communicates with the ECU 205 (e.g., over a wired connection). The rear shock actuator assembly 200B also communicates (e.g., over a wired connection) with one or more sensors 215B (e.g., stroke sensors). In some embodiments, the sensors 215B measure a position of a rear jack in a suspension stroke of a rear suspension system of the vehicle. As illustrated in FIG. 3, the ECU 205 also communicates with the CAN bus 220.

In the actuator system 290, the front fork actuator assembly 200A receives a target front height signal from the ECU 205 (as a command signal 230A). The controller 202A processes the target front height signal and current height data received from the sensors 215A (as data signals 235A) to compute a control signal 240A to drive the actuators 204A (i.e., solenoid valves). The controller 202A also computes and transmits a status signal 245A to the ECU 205. The status signal 245A can report a front height value and a front fork status to the ECU 205. It should be understood that the status signal 245A provided by the controller 202A can include other information regarding the front fork and/or the front fork actuator assembly 200A.

Similarly, the rear shock actuator assembly 200B receives a target rear height signal from the ECU 205 (as a command signal 230B). The controller 202B processes the target rear height signal and height data received from the sensors 215B (as data signals 235B) and computes a control signal 240B to drive the actuators 204B (i.e., solenoid valves). The controller 202B can report a rear height value and a rear shock status to the ECU 205. It should be understood that the status signal 245B provided by the controller 202B can include other information regarding the rear shocks and/or the rear shock actuator assembly 200B.

The ECU 205 monitors the status signals 245A, 245B received from the assemblies 200A, 200B. Based on this information (and, optionally, information received from other vehicle components over the CAN bus 220), the ECU 205 adjusts one or more both of the command signals 230A, 230B sent to the front fork actuator assembly 200A and the rear shock actuator assembly 200B. The ECU 205 can also determine relevant suspension system data and report the suspension system data on the CAN bus 220. This data can include a suspension system status, a vehicle height, and a fault indicator.

Figure 5:
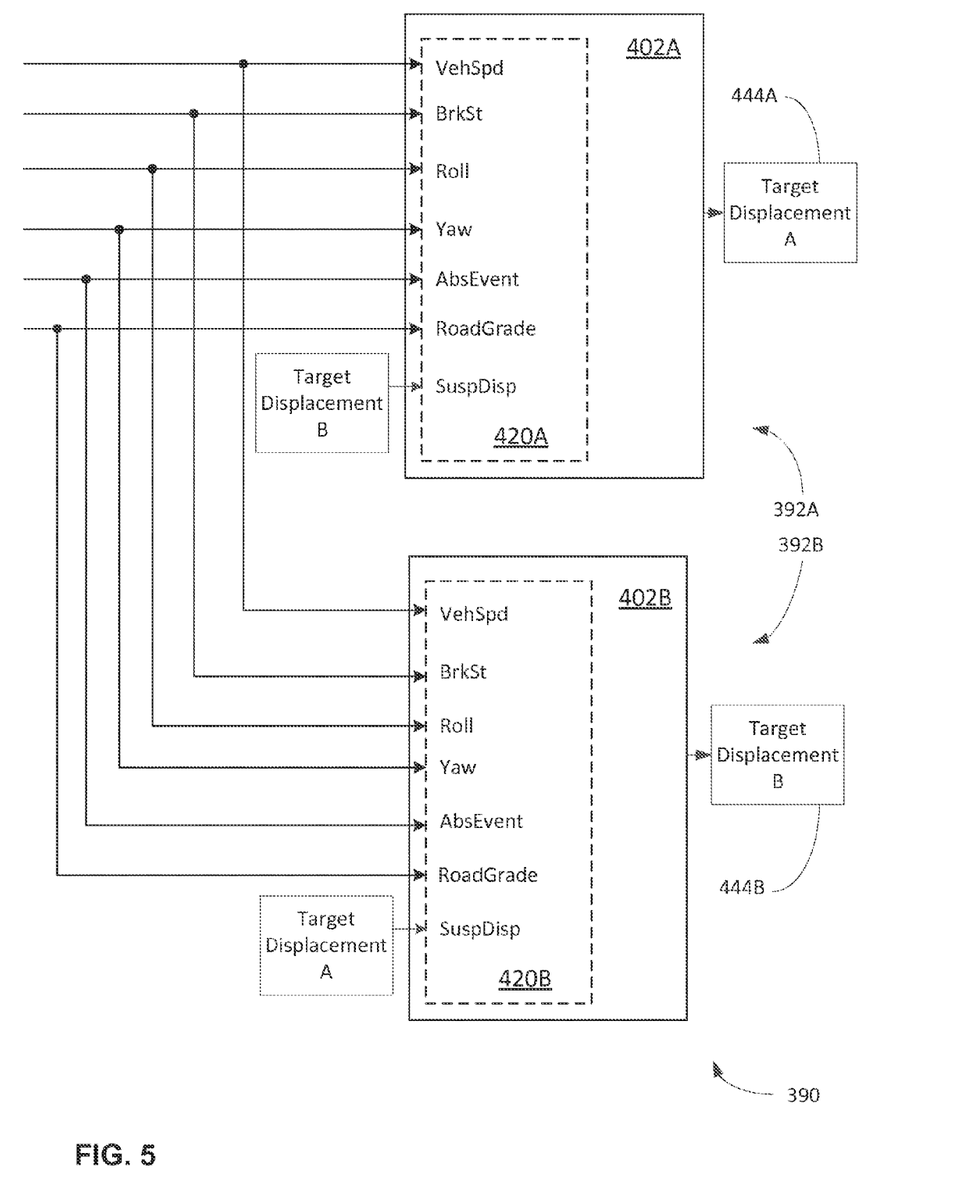
FIG. 5 schematically illustrates a system for controlling a suspension system of a vehicle.

FIG. 5 schematically illustrates another system 390 for controlling a suspension system of a vehicle. For example, a vehicle can include a variable ride height suspension system that includes a front suspension system 392A and a rear suspension system 392B. Each suspension system is associated with a controller 402A, 402B. In some embodiments, each controller 402A, 402B is included in an actuator assembly as described above. For example, each suspension system 392A, 392B can be associated with an actuator assembly that includes the controller 402A, 402B and one or more actuators (e.g., electronic actuators including solenoid valves). In other embodiments, a single actuator assembly can be used to control both the front suspension system 392A and the rear suspension system 392B. Also, it should be understood that in some embodiments, the functionality performed by the controllers 402A, 402B described below is performed by one or more controllers not included in an actuator assembly as described above.

The controller 402A, 402B associated with each suspension system 392A, 392B receives a plurality input signals 420A, 420B. In some implementations, at least some of the signals 420A, 420B are provided by sensors located in the vehicle, such as wheel speed sensors (or other speed sensors), brake switches, longitudinal acceleration sensors, lateral acceleration sensors, inclinometer sensors, roll rate sensors, yaw rate sensors, etc. Alternatively or in addition, the input signals 420A, 420B can be provided by other controls systems of the vehicle (e.g., an anti-lock braking system, a braking system, etc.). For example, the wheel speed sensors can provide a vehicle speed ("VehSpd") signal. The brake switches and/or a controller for a braking system of the vehicle can provide a brake status ("BrkSt"). The roll rate sensors can provide a roll ("Roll") rate signal. The yaw rate sensors can provide a yaw ("Yaw") rate signal. The anti-lock braking system ("ABS") can provide an ABS event ("AbsEvent") signal. The longitudinal acceleration sensors, lateral acceleration sensors, and/or inclinometer sensors can provide a road grade and surface ("RoadGrade") status. It should be understood that other sensors and/or other control systems can provide the input signals 420A, 420B in addition to or as an alternative to those described above.

Based on the input signals 420A, 420B, each controller 402A, 402B determines a target displacement. As illustrated in FIG. 5, each controller 402A, 402B outputs the determined target displacement (e.g., as an output 444A and 444B, respectively). As also illustrated in FIG. 5, each controller 402A, 402B receives the target displacement output by the other controller 402A, 402B (e.g., as a suspension displacement ("SuspDisp") input). As described in more detail below, the controllers 402A, 402B can exchange target displacements, and each controller 402A, 402B can use the target displacement determined by the other controller 402A, 402B as an input signal 420A, 420B for determining a target displacement.

It should be understood that, in some embodiments, the target displacements for the front and rear suspension systems 392A, 392B exchanged by the controllers 402A, 402B are determined at the same point in time. In other embodiments, the target displacements determined at different points in time. Also, it should be understood that, in some embodiments, alternatively or in addition to determining a target displacement for one suspension system based on the target displacement determined for the other suspension system, a controller 402A, 402B can be configured to use a current displacement state of the other suspension system (e.g., a currently-sensed displacement rather than a controller-established desired displacement).

Figure 6A:
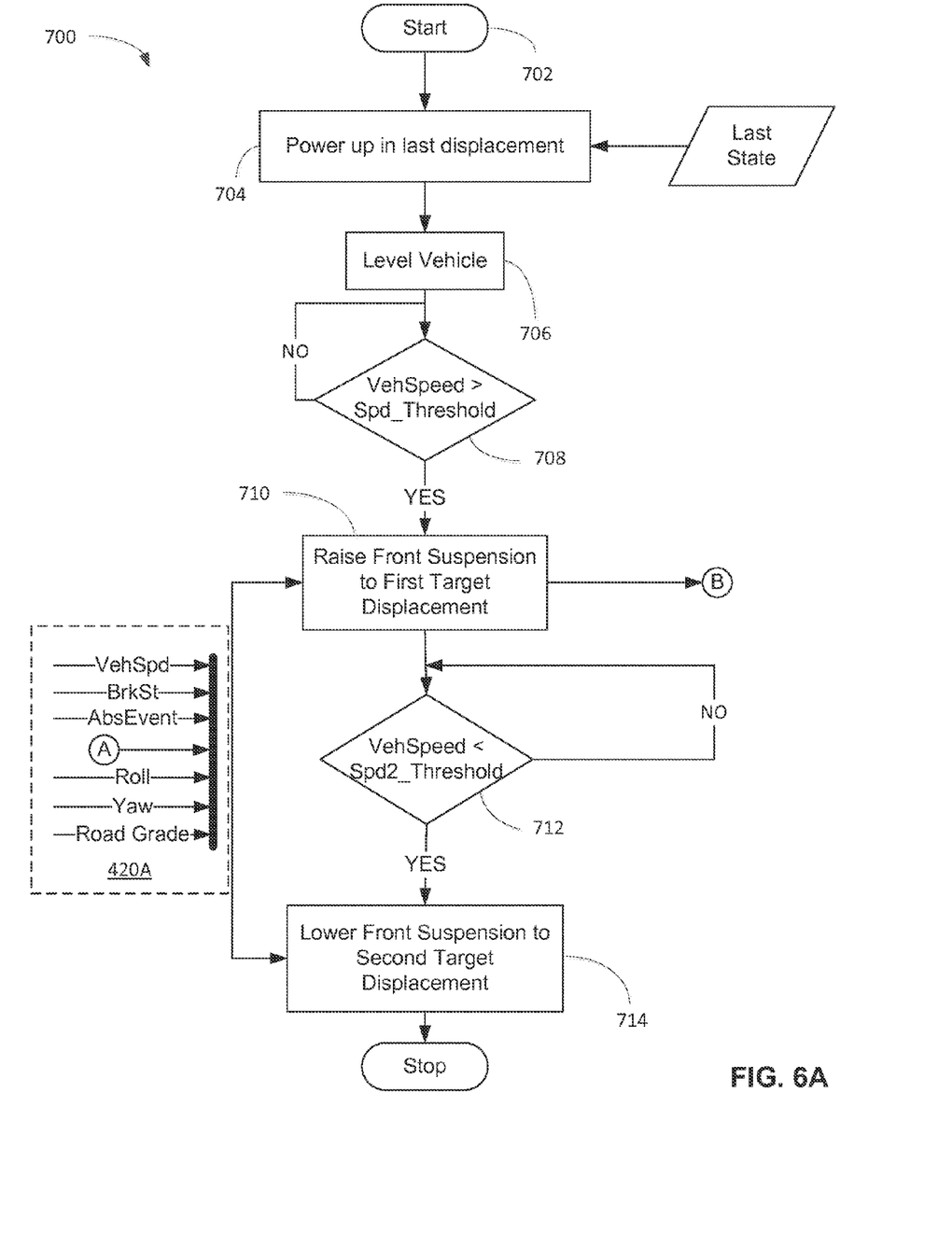
FIGS. 6A and 6B are a flow chart illustrating a method of controlling a suspension system of a vehicle using the system of FIG. 5.
Figure 6B:
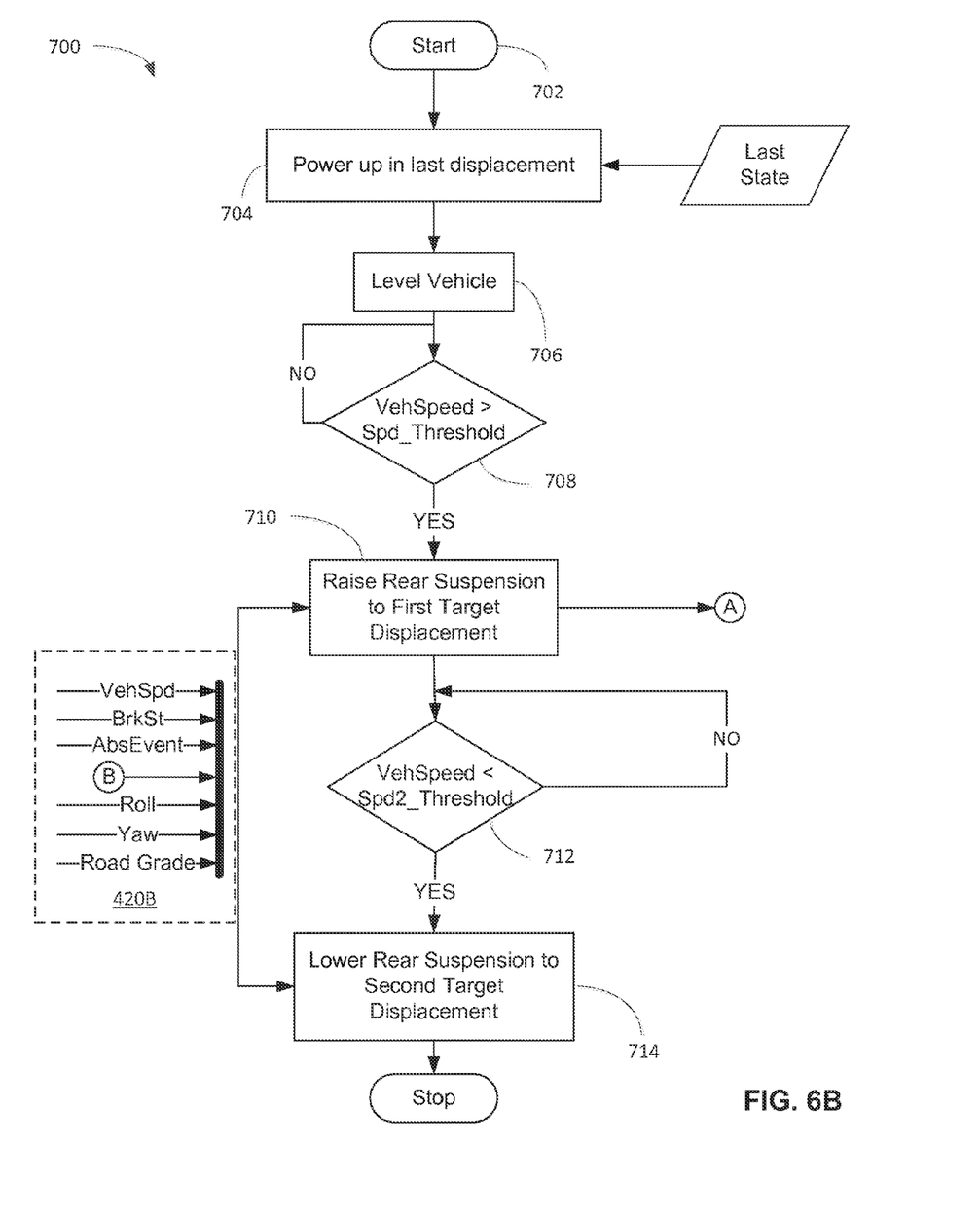

FIGS. 6A and 6B are a flow chart illustrating a method 700 of controlling the front and rear suspension systems 392A, 392B using the system 390. As illustrated in FIG. 6, upon startup (i.e., initialization) (at block 702), the front suspension system 392A powers up in a last displacement state (i.e., the last target displacement set for the front suspension system 392A) (at block 704). The displacement state of the front suspension system 392A is adjusted to level the vehicle (e.g., by setting the target displacement of the front suspension to a predetermined value) (at block 706). As the vehicle operates, the controller 402A associated with the front suspension system 392A monitors a speed of the vehicle (e.g., through a wheel speed sensor). When the controller 402A detects that the vehicle speed ("VehSpeed") exceeds a first predetermined threshold ("Spd_Threshold") value (e.g., approximately 10.0 kilometers per hour) (at block 708), the controller 402A sets the displacement of the front suspension system 392A to a first target displacement (at block 710).

As illustrated in FIG. 6A, after raising the front suspension to the first target displacement, the controller 402A continues to monitor the speed of the vehicle and when the controller 402A detects that the vehicle speed is less than a second predetermined threshold value ("Spd2_Threshold") (at block 712), the controller 402A sets the displacement of the front suspension system 392A to a second target displacement (at block 714). In some embodiments, the second target displacement is less than the first target displacement. It should be also understood that in some embodiments, the first and second predetermined thresholds are the same.

As illustrated in FIG. 6A, regardless of whether the controller 402A sets the displacement to the first target displacement or the second target displacement, the controller 402A uses the input signals 420A to determine the target displacement. For example, the controller 402A determines the first and second target displacements as a function of the input signals 420A. As noted above, the input signals 420A can include the speed of the vehicle, a current state of the vehicle's braking system, an anti-lock braking system status (e.g., active or inactive), a lean angle (e.g., roll, yaw, etc.) of the vehicle, the grade of the road, and the surface (e.g., mu) of the road. For example, in some embodiments, the front target displacement is greater at higher speeds of the vehicle, when the vehicle's brakes are applied, when the anti-lock braking system is activated, when the grade of the road is negative (i.e., the vehicle is traveling downhill) within a certain predetermined range, and/or when the vehicle is decelerating. As noted above, the input signals 420A also includes the displacement (e.g., target or current displacement) of the rear suspension system 392B. Accordingly, the target displacement calculated by the controller 402A associated with the front suspension system 392A is based on the target displacement calculated by the controller 402B associated with the rear suspension system 392B. This exchange of information independently calculated by each controller 402A, 402B for the front and rear suspension systems 392A, 392B improves the performance of the variable height suspension system. For example, the independent calculations allow each controller 402A, 402B to consider different vehicle operation parameters (e.g., signals from different sensors). Similarly, the independent calculations allow the front and rear suspension systems 392A, 392B to be independent adjusted based on driver preferences or profiles and riding situations or conditions. Exchanging the target displacements calculated by each controller 402A, 402B, however, controls rider displacement and vehicle pitch.

As illustrated in FIG. 6B, the functionality described above for the front suspension system 392A can also be performed for the rear suspension system 392B (e.g., using the separate controller 402B). It should be understood, however, that, in some embodiments, the functionality performed for the rear suspension system 392B can use different threshold values (e.g., different speed threshold values for selecting between the first target displacement and the second target displacement), different parameters, and different functions for processing or applying the parameters to calculate the first and second target displacement. Furthermore, it should be understood that, in some embodiments, the controllers 402A, 402B can use additional threshold values to switch between more than just two target displacements. For example, in some embodiments, one or both of the controllers 402A, 402B can apply three or more different target displacements depending on the vehicle speed. Each target displacements can correspond to a range in vehicle speed. Also, it should be understood that, in some embodiments, the target displacement determined by the controller 402A for the front suspension system 392A is different than the target displacement determined by the controller 402B for the rear suspension system 392B.

As noted above, the system 390 can be used with the actuator assembly described above. For example, in some embodiments, each controller 402A, 402B is included in an actuator assembly that includes the controller 402A, 402B and one or more actuators for controlling a height of the front or rear suspension system 392A, 392B of the vehicle. To exchange the target displacements determined by the controllers 402A, 402B, each controller 402A, 402B can act as the ECU 205 described above for the other controller 402A, 402B. For example, the controller 402A can transmit the calculated target displacement for the front suspension system 392A as a command signal 230 to the controller 402B. Similarly, the controller 402B can transmit the calculated target displacement for the rear suspension system 392B as a command signal 230 to the controller 402A. Accordingly, each controller 402A, 402B can perform local processing as part of an actuator assembly while sharing determined target displacements with the other actuator assembly. It should be understood that, in other embodiments, a separate ECU can be used to exchange data between the controllers 402A, 402B and/or provider supervisory control. For example, the ECU can receive the determined target displacements from the controllers 402A, 402B (e.g., as status signals 245A, 245B) and provide command signals 230A, 230B to each controller 402A, 402B accordingly. In other embodiments, the ECU can communicate with the controller 402A, 402B even if the controller 402A, 402B directly communicate (e.g., to provide supervisory control).

Thus, embodiments of the invention provide smart actuators that provide local control and remote supervision. The smart actuators can be used to control various aspects of a vehicle, including suspension. Embodiments also provide systems and methods for controlling a variable ride height suspension system of a vehicle by exchanging target displacements associated with the front suspension system and the rear suspension system. It should be understood that embodiments described herein can be used with any type of vehicle, including two-wheel and three-wheel motorcycles.

Various features and advantages of the invention are set forth in the following claims.

What is claimed is:

1. An assembly for a vehicle, the assembly comprising:
   an actuator, and
   a controller configured to
      receive a command signal from a vehicle electronic control unit,
      receive a data signal from a sensor,
      determine a control signal for the actuator based on the command signal from the vehicle electronic control unit and the data signal from the sensor,
      transmit the control signal to the actuator,
      determine a status signal based on the control signal, and
      transmit the status signal to the vehicle electronic control unit.

2. The assembly of claim 1, wherein the controller communicates with the sensor over a direct connection.

3. The assembly of claim 1, wherein the data signal is not received by the vehicle electronic control unit.

4. The assembly of claim 1, wherein the command signal received from the vehicle electronic control unit is based on a previously-transmitted status signal from the controller.

5. The assembly of claim 1, wherein the command signal establishes a threshold and wherein the controller is configured to determine the control signal by comparing the data signal to the threshold.

6. The assembly of claim 1, wherein the control signal drives the actuator to adjust a suspension system of the vehicle.

7. The assembly of claim 1, wherein the sensor includes a stroke sensor.

8. A system for controlling a suspension system of a vehicle, the system comprising:
   a first actuator assembly associated with a front suspension system of a vehicle, the first actuator assembly including
      a first actuator, and
      a first controller configured to
         receive a first command signal from a vehicle electronic control unit,
         receive a first data signal from a first sensor,
         determine a first control signal for the first actuator based on the first command signal from the vehicle electronic control unit and the first data signal from the first sensor,
         transmit the first control signal to the first actuator,
         determine a first status signal based on the first control signal, and
         transmit the first status signal to the vehicle electronic control unit; and
   a second actuator assembly associated with a rear suspension system of the vehicle, the second actuator assembly including
      a second actuator, and
      a second controller configured to
         receive a second command signal from the vehicle electronic control unit,
         receive a second data signal from a second sensor,
         determine a second control signal for the second actuator based on the second command signal from the vehicle electronic control unit and the second data signal from the second sensor,
         transmit the second control signal to the second actuator,
         determine a second status signal based on the second control signal, and
         transmit the second status signal to the vehicle electronic control unit.

9. The system of claim 8, wherein the first sensor includes a stroke sensor measuring a position of a front jack.

10. The system of claim 8, wherein the second sensor includes a stroke sensor measuring a position of a rear jack.

11. The system of claim 8, wherein the first command signal includes a target front height.

12. The system of claim 11, wherein the first controller is configured to determine the first control signal by comparing the first data signal to the target front height.

13. The system of claim 11, wherein the first status signal includes a front height value.

14. The system of claim 8, wherein the second command signal includes a target rear height.

15. The system of claim 14, wherein the first controller is configured to determine the first control signal by comparing the first data signal to the target rear height.

16. The system of claim 14, wherein the second status signal includes a rear height value.

17. The system of claim 8, wherein the first controller is further configured to receive a target displacement calculated by the second controller and is configured to determine the first control signal based on the target displacement calculated by the second controller.

18. The system of claim 8, wherein the second controller is further configured to receive a target displacement calculated by the first controller and is configured to determine the second control signal based on the target displacement calculated by the first controller.

19. The system of claim 8, wherein the first actuator assembly is located within a front fork assembly of the vehicle.

20. The system of claim 8, wherein the second actuator assembly is located within a rear shock assembly of the vehicle.

21. A method of controlling a vehicle, the method comprising:
   receiving, by a first controller, an input signal representing vehicle operating parameters;
   receiving, by the first controller, a target displacement determined by a second controller for a first suspension system of the vehicle;
   determining, by the first controller, a target displacement for a second suspension system of the vehicle based on the target displacement received from the second controller and the input signal; and setting a height of the second suspension system based on the target displacement determined by the first controller for the second suspension system.

22. The method of claim 21, further comprising:
receiving, by the second controller, the input signal;
receiving, by the second controller, the target displacement determined by the first controller;
determining, by the second controller, a target displacement for the first suspension based on the target displacement received from the first controller and the input signal.

23. The method of claim 21, wherein receiving the input signal includes receiving a speed of the vehicle and wherein determining the target displacement for the second suspension system includes comparing the speed of the vehicle to a first threshold, setting the target displacement to a first target displacement when the speed of the vehicle exceeds the first threshold, comparing the speed of the vehicle to a second threshold, and setting the target displacement to a second target displacement when the speed of the vehicle is less than the second threshold.

24. The method of claim 21, wherein receiving the input signal includes receiving a speed of the vehicle, a brake status of the vehicle, anti-lock braking event activity of the vehicle, a roll rate of the vehicle, a yaw rate of the vehicle, and a road grade.

25. The method of claim 21, wherein receiving the target displacement determined by the second controller includes receiving a target displacement determined by the second controller at a previous period of time.

* * * * *